(12) United States Patent
Lo

(10) Patent No.: US 7,111,054 B2
(45) Date of Patent: Sep. 19, 2006

(54) CUSTOMER PREMISES EQUIPMENT AUTOCONFIGURATION

(75) Inventor: Kwoktung B. Lo, San Jose, CA (US)

(73) Assignee: 2Wire, Inc., San Jose, CA (US)

( * ) Notice: Subject to any disclaimer, the term of this patent is extended or adjusted under 35 U.S.C. 154(b) by 846 days.

(21) Appl. No.: 09/941,358

(22) Filed: Aug. 28, 2001

(65) Prior Publication Data

US 2002/0026504 A1    Feb. 28, 2002

Related U.S. Application Data

(60) Provisional application No. 60/228,365, filed on Aug. 28, 2000.

(51) Int. Cl.
*G06F 15/177* (2006.01)
*H04L 12/28* (2006.01)
*H04L 12/56* (2006.01)

(52) U.S. Cl. .............. 709/220; 709/250; 370/254

(58) Field of Classification Search ........ 709/220–222, 709/223, 226, 227, 250, 225, 229; 370/395.1, 370/395.6, 395.61, 254, 463, 465
See application file for complete search history.

(56) References Cited

U.S. PATENT DOCUMENTS

| | | | | |
|---|---|---|---|---|
| 5,627,836 | A * | 5/1997 | Conoscenti et al. | 370/397 |
| 5,903,572 | A * | 5/1999 | Wright et al. | 370/463 |
| 6,028,863 | A * | 2/2000 | Sasagawa et al. | 370/399 |
| 6,070,187 | A | 5/2000 | Subramaniam et al. | |
| 6,084,876 | A * | 7/2000 | Kwok et al. | 370/379 |
| 6,118,768 | A | 9/2000 | Bhatia et al. | |
| 6,119,157 | A | 9/2000 | Traversat et al. | |
| 6,134,588 | A * | 10/2000 | Guenthner et al. | 709/226 |
| 6,161,125 | A | 12/2000 | Traversat et al. | |
| 6,212,559 | B1 * | 4/2001 | Bixler et al. | 709/221 |
| 6,356,563 | B1 * | 3/2002 | Nicoll et al. | 370/466 |
| 6,480,494 | B1 * | 11/2002 | Hawley | 370/395.61 |
| 6,487,601 | B1 * | 11/2002 | Hubacher et al. | 709/229 |
| 6,510,157 | B1 * | 1/2003 | Kwok et al. | 370/395.2 |
| 6,604,140 | B1 * | 8/2003 | Beck et al. | 709/226 |
| 6,636,505 | B1 * | 10/2003 | Wang et al. | 370/352 |
| 6,662,223 | B1 * | 12/2003 | Zhang et al. | 709/224 |
| 6,711,162 | B1 * | 3/2004 | Ortega et al. | 370/389 |
| 6,741,599 | B1 * | 5/2004 | Dunn et al. | 370/395.6 |
| 6,760,333 | B1 * | 7/2004 | Moody et al. | 370/395.1 |

OTHER PUBLICATIONS

Thomas Starr, John M. Cioffi and Peter Silverman, "Understanding Digital Subscriber Line Technology", 1999 Prentice Hall PTR, Prentice-Hall, Inc, Chapter 14, pp. 391-418.

(Continued)

*Primary Examiner*—Bharat Barot
(74) *Attorney, Agent, or Firm*—Blakely, Sokoloff, Taylor & Zafman LLP

(57) ABSTRACT

A system and method for automatically configuring customer premises equipment, the system including a search module configured to select a set of configuration values and to create a discover packet including the set of configuration values. The discover packet is transmitted to attempt a connection with a network access device. If no response packet is received from the network access device, the search module selects another set of configuration values and creates another discover packet. If a response packet is received from the network access device, the search module stores the correct configuration values from the header of the response packet into a configuration register. A memory stores a subset of all possible configuration values including commonly used values.

21 Claims, 3 Drawing Sheets

OTHER PUBLICATIONS

Dr. Walter Y. Chen, "Macmillan Technology Series DSL Simulation Techniques and Standards Development for Digital Subscriber Line Systems", Macmillan Technical Publishing, Indianapolis, Indiana, 1998, Chapter 1, pp. 7 & 8, Chapter 2, pp. 16-19 and 23-28, Chapter 11, pp. 327-331 and Chapter 13, pp. 481-490.

* cited by examiner

CUSTOMER PREMISES EQUIPMENT AUTOCONFIGURATION

CROSS-REFERENCE TO RELATED APPLICATION

This application is related to, and claims the benefit of, U.S. Provisional Patent Application No. 60/228,365, entitled "CPE Broadband Autoconfiguration," filed on Aug. 28, 2000, the subject matter of which is hereby incorporated by reference.

BACKGROUND

1. Technical Field

The present system and method relate generally to electronic networks, and more particularly to a system and method for automatically configuring customer premises equipment.

2. Description of Background Art

Customer premises equipment (CPE), such as a digital subscriber line (DSL) broadband modem, requires certain configuration information at the time of installation for use with a particular broadband service. For some types of customer premises equipment, the configuration information includes asynchronous transfer mode (ATM) circuit values. ATM is a network technology that allows cells, which are fixed size data packets, to travel on a specific channel. ATM circuit values include virtual path identifier (VPI) values, virtual channel identifier (VCI) values, and ATM encapsulation types. The VPI is an eight-bit or twelve-bit field in an ATM cell header that indicates end-to-end routing information of the cell. The VCI is a sixteen-bit field in an ATM cell header that identifies the channel inside the virtual path over which the cell is to travel. ATM encapsulation type refers to the method used to preserve, or encapsulate, other network protocols, for example TCP/IP, over ATM. ATM encapsulation types include logical link control (LLC) and VC-based multiplexing (VCMUX).

Although ATM circuit values are required to configure customer premises equipment, service providers do not always provide customers with complete configuration information. Moreover, even with the correct configuration information, customers may not correctly enter the configuration information. In either case, not having or not correctly entering the configuration information results in an inability to connect the customer premises equipment to the service provider.

Additional details regarding DSL technology generally are described in *Understanding Digital Subscriber Line Technology* by Starr, Cioffi, and Silverman, Prentice Hall 1999, ISBN 0137805454 and in *DSL—Simulation Techniques and Standards Development for Digital Subscriber Line Systems* by Walter Y. Chen, Macmillan Technical Publishing, ISBN 1578700175, the disclosures of which are hereby incorporated by reference.

SUMMARY

The system and method of the invention allows for automatically configuring customer premises equipment. In one embodiment, the system includes a broadband modem capable of transmitting data to a network. The broadband modem has a modem chipset, an ATM SAR, a memory, a processor, and an interface capable of connecting the broadband modem to a broadband device, such as a computer. The modem chipset enables communication between electronic devices via a telephone line. The modem chipset is coupled to the ATM SAR, which allows packets to be created for transmission and reassembled upon receipt. The memory includes a configuration table that stores a plurality of sets of configuration values for the broadband modem. In one embodiment, each set of configuration values includes three types of configuration values, VPI, VCI, and ATM encapsulation types. The memory also stores other software, as well as the final configuration settings for the broadband modem. The processor is coupled to the memory device, and is used to execute program instructions.

In one embodiment, the plurality of sets of configuration values includes a subset of commonly used VPI values and VCI values. The broadband modem transmits these values to a network access device by way of discover packets until a correct configuration match is found. The ATM encapsulation types may also be transmitted to completely configure the broadband modem.

The method of the invention includes selecting a set of configuration values and creating a discover packet for that set of configuration values. Next, the broadband modem transmits the discover packet to a network access device, such as an access concentrator, and then waits for a response for a predetermined time period. If no response packet is received from the network access device during the predetermined time period, the another set of configuration values is selected and another discover packet including these values is transmitted to the network access device. If a positive response packet is received from the network access device, the method continues with storing the configuration information in the response packet in memory. If no response packet is received for each set of configuration values stored in memory, then the method ends with reporting a failure to establish a connection to the network access device.

DETAILED DESCRIPTION OF THE DRAWINGS

Figure 1:
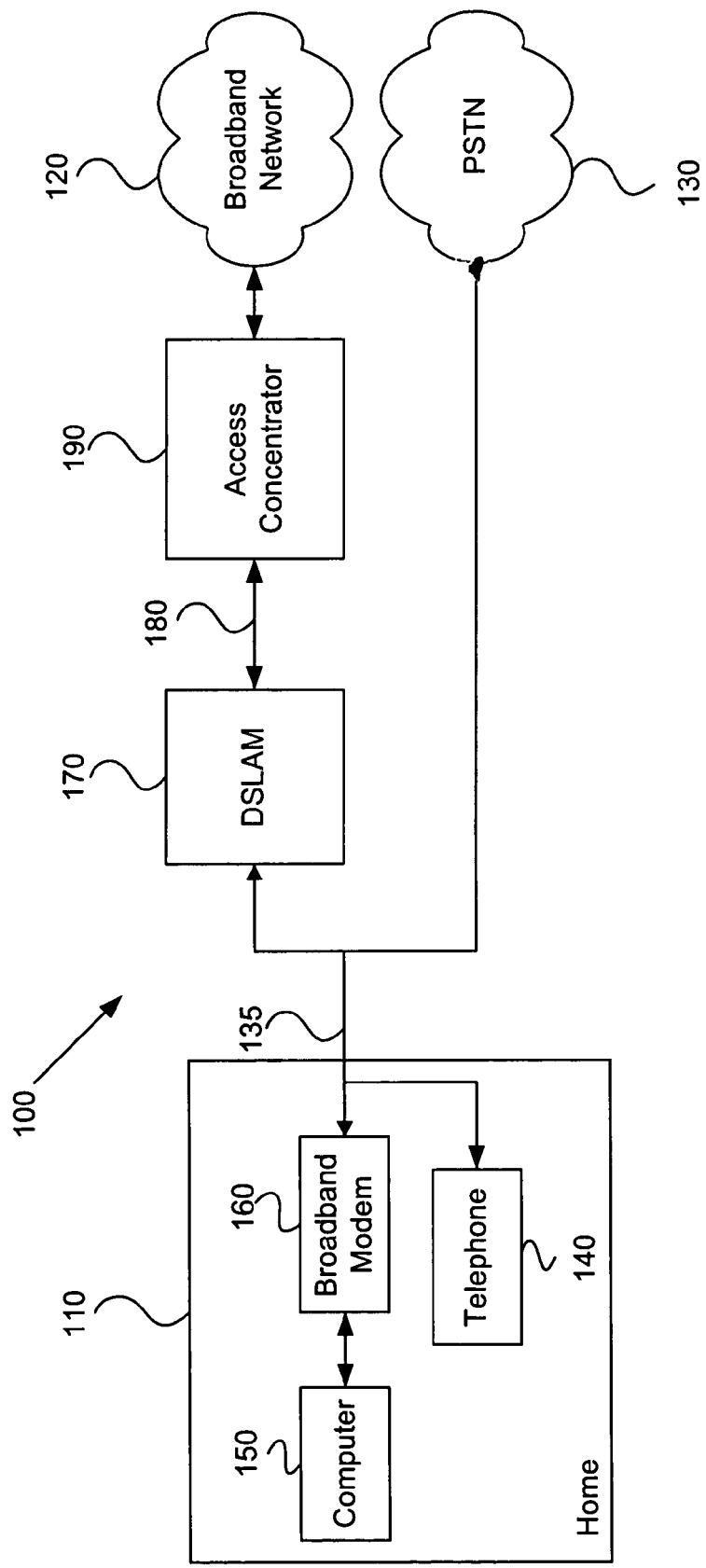
FIG. 1 illustrates an electronic network that connects a home to a broadband network and a PSTN network, in accordance with the invention.

FIG. 1 illustrates one embodiment of an electronic network 100 that includes a home 110, a broadband network 120, and a public switched telephone network (PSTN) 130. A telephone line 135 connects home 110 to PSTN 130 and to a Digital Subscriber Line Access Multiplexer (DSLAM) 170, which communicates via a high speed Asynchronous Transfer Mode (ATM) line 180 with an access concentrator 190. DSLAM 170 and access concentrator 190 are typically resident in a central office of a service provider. Access concentrator 190 provides a direct link to broadband network 120. Although a home 110 is shown in FIG. 1, any other premises, such as an office, is within the scope of the invention. Although a DSLAM 170 and a broadband access concentrator 190 are shown in FIG. 1, other network access devices are within the scope of the invention.

Home 110 includes, but is not limited to, a computer 150, a broadband modem 160, and a telephone 140. Broadband modem 160 and telephone 140 are coupled to telephone line 135, which provides a connection between telephone 140 and PSTN network 130 and a connection between broadband modem 160 and DSLAM 170. Although FIG. 1 shows a broadband modem 160, other types of customer premises equipment (CPE) are within the scope of the invention.

Figure 2:
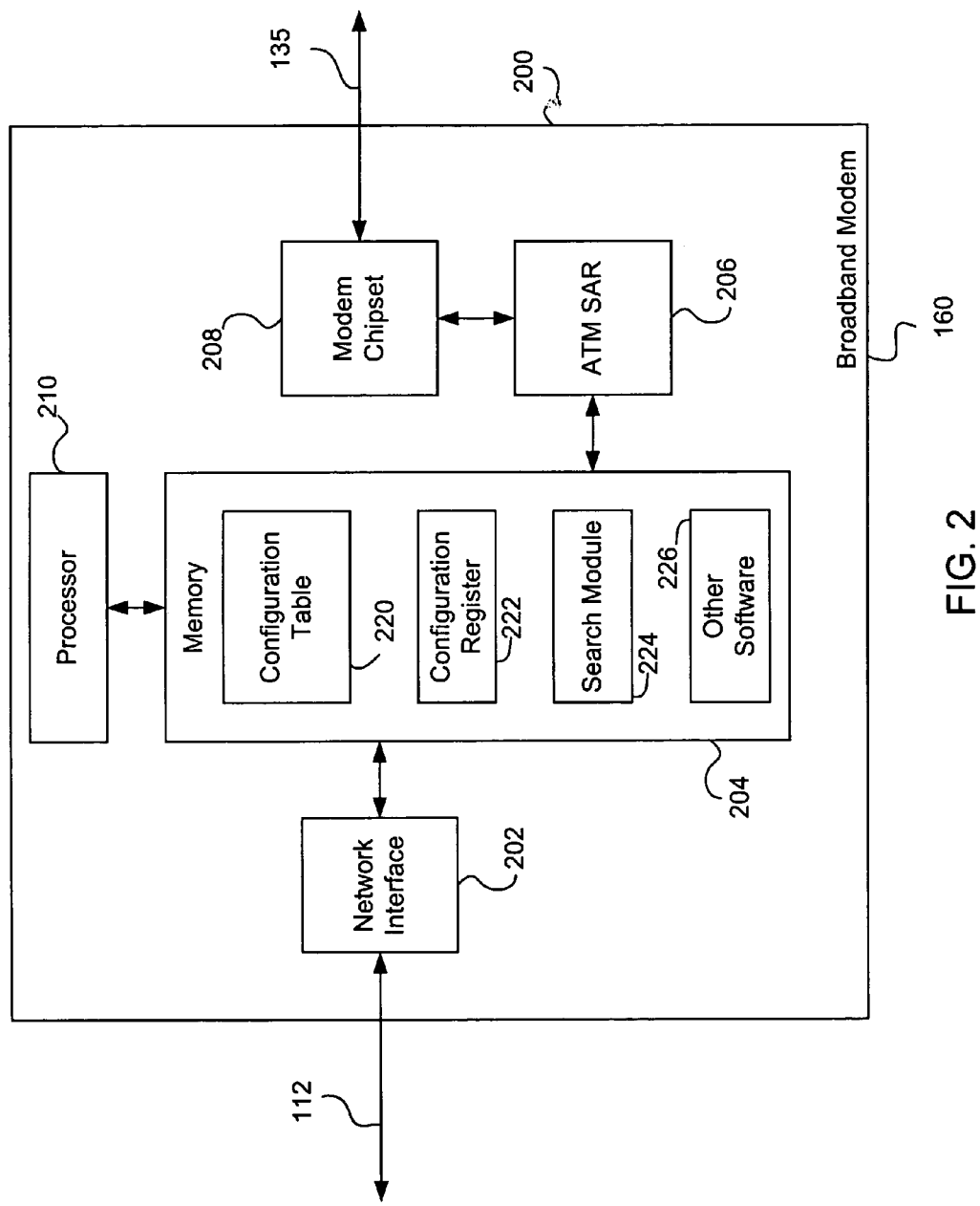
FIG. 2 illustrates one embodiment of the broadband modem of FIG. 1, in accordance with the invention.

FIG. 2 illustrates one embodiment of broadband modem 160 of FIG. 1, in accordance with the invention. Broadband modem 160 includes, but is not limited to, a network interface 202, a memory 204, an ATM segmentation and reassembly (SAR) module 206, a broadband modem chipset 208, and a processor 210. Network interface 202 can be any network interface, such as a serial or USB interface, that allows broadband modem 160 to communicate with computer 150. Processor 210 and memory device 204 perform the functions necessary to configure broadband modem 160 and then establish and maintain connections between computer 150 and broadband network 120. Processor 210 is any device, such as a central processing unit, that executes program instructions.

Memory device 204 includes, but is not limited to, a configuration table 220, a configuration register 222, a search module 224, and other software 226. Several different memory types may be used by memory 204, alone or in combination, including volatile memory and non-volatile memory. Configuration table 220 preferably includes a plurality of sets of configuration values. Each set of configuration values includes a VPI value, a VCI value, and an ATM encapsulation type (such as LLC or VCMUX). In one embodiment, configuration table 220 includes VPI values and VCI values commonly used by broadband equipment, which typically consist of fewer than twenty values. By using this subset of common values, the configuration time of broadband modem 160 is greatly reduced compared to the time that would be required to test all possible combinations of VPI values and VCI values. In one embodiment, the configuration values are stored in configuration table 220 during the manufacture of broadband modem 160.

Other software 226 may contain data forwarding software (such as Internet Protocol (IP) routing software), control software (such as point-to-point protocol over Ethernet (PPPoE) software), and IP services software (such as domain name service (DNS) services). ATM SAR 206 is responsible for segmenting data into cells and reassembling cells into data, and can be implemented as either hardware (as shown in FIG. 2) or software. For example, other software 226 may contain software with functionality equivalent to the functionality of ATM SAR 206. Modem chipset 208 typically includes an analog front end, a discrete multitone ADSL modem chip, and a network controller. As those skilled in the art will appreciate, some or all of the software and data contained in memory 204 could also be stored in an external storage device, such as a CD-ROM, in computer 150.

Search module 224 is configured to determine which set of configuration values, if any, stored in configuration table 220 is appropriate for establishing communications between broadband modem 160 and access concentrator 190. In one embodiment, search module 224 selects a set of configuration values from configuration table 220, and builds a discover packet that broadband modem 160 transmits over telephone line 135. The discover packet includes the configuration values from the set selected by search module 224. The discover packet may comprise an initial packet or set of packets transmitted at or near the beginning of a connecting process, such as a PPPoE connecting process. After sending the discover packet, search module 224 waits for a predetermined time period for a response packet, such as an acknowledgment, from access concentrator 190. The response packet may be any packet received by broadband modem 160 from access concentrator 190 that acknowledges, is responsive to, or is otherwise related to the receipt of a discover packet by access concentrator 190. If a response packet is not received before the end of the predetermined time period, broadband modem 160 transmits another discover packet that includes a different set of parameter values, and then waits for a response packet.

In one embodiment, search module 224 creates multiple discover packets, each having a different set of configuration values. Broadband modem 160 transmits the multiple discover packets one after the other without waiting for a response packet before transmitting another discover packet. In one embodiment, broadband modem 160 transmits a group of one or more discover packets every two seconds for a period of eight seconds or until a response packet is received from access concentrator 190.

Upon receipt of a response packet by broadband modem 160, search module 224 determines the correct configuration information from the header of the response packet and determines the presence of broadband service associated with the correction configuration information. The correct configuration information includes a VPI value, a VCI value, and an ATM encapsulation type. If search module 224 determines the existence of the correct configuration information, search module 224 then stores the correct configuration information in configuration register 222 for later access by other software 226. For example, when broadband modem 160 initiates a training process, other software 226 may access the configuration information stored in configuration register 222. If a response packet is not received for any set of configuration values, then search module 224 reports that service is unavailable from access concentrator 190. Service may be unavailable because none of the configuration values stored in configuration table 222 matches the configuration requirements of access concentrator 190, because access concentrator 190 is not currently operable to provide service, or various other reasons.

Figure 3:
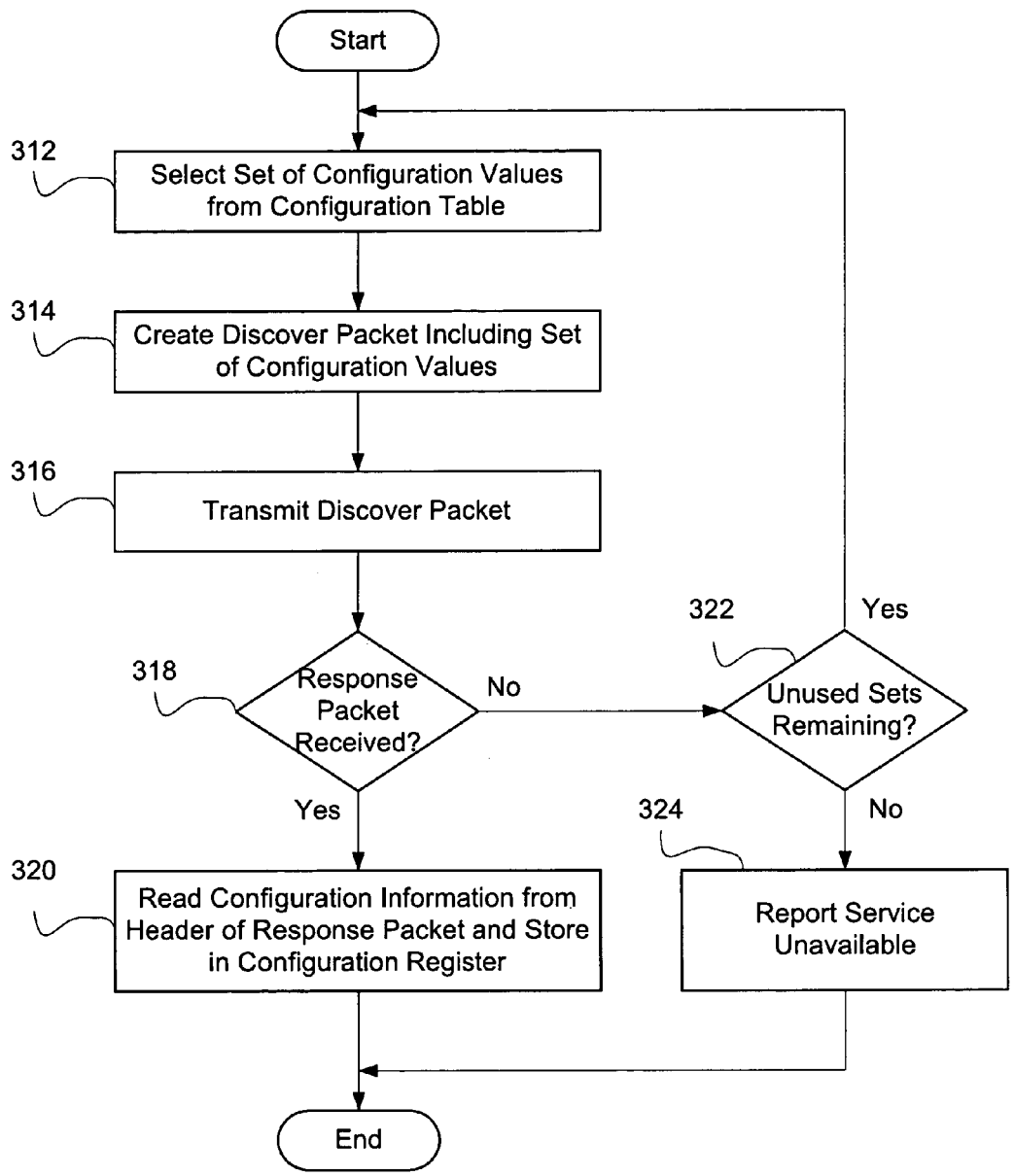
FIG. 3 is a flowchart illustrating a method for automatically configuring a broadband modem, in accordance with one embodiment of the invention.

FIG. 3 is a flowchart of method steps for automatically configuring broadband modem 160, according to one embodiment of the invention. First, in step 312, search module 224 selects a first set of configuration values stored in configuration table 220. In step 314, search module 224 creates a discover packet that includes the first set of configuration values. In step 316, broadband modem 160 transmits the discover packet to access concentrator 190. In another embodiment, search module 224 selects multiple sets of configuration values from configuration table 220 and creates multiple discover packets, each discover packet having a different set of configuration values. Broadband modem 160 then transmits the multiple discover packets one after another without waiting for a response packet between transmitting discover packets.

In step 318, search module 224 determines whether a response packet has been received from access concentrator 190 before the end of a predetermined period. If a response has been received, then in step 320 search module 224 reads the configuration information from the header of the response packet and stores the configuration information in configuration register 222. If a response packet was not received by the end of the predetermined time period, then in step 322 search module 224 determines whether any unused sets of configuration values remain in configuration table 220. If at least one unused set of configuration values remains in configuration table 220, the FIG. 3 method returns to step 312, where search module 224 selects another set of configuration values from configuration table 220. If no unused sets of configuration values remain in configuration table 220, then in step 324 search module 224 reports that broadband service is not available and notifies a user via computer 150.

The invention has been described above with reference to specific embodiments. It will, however, be evident that various modifications and changes may be made thereto without departing from the broader spirit and scope of the invention. The foregoing description and drawings are, accordingly, to be regarded in an illustrative rather than a restrictive sense.

What is claimed is:

1. A method for configuring customer premises equipment, comprising the steps of:
    selecting a set of configuration values;
    transmitting a discover packet including the set of configuration values to a network access device;
    if a response packet is not received from the network access device during a predetermined time period, selecting another set of configuration values and transmitting another discover packet including the other set of configuration values; and
    if a response packet is received from the network access device during the predetermined time period, storing configuration information from the response packet into memory.

2. The method of claim 1, wherein the set of configuration values is stored in a configuration table.

3. The method of claim 2, wherein the configuration table includes a plurality of sets of configuration values.

4. The method of claim 3, wherein the plurality of sets of configuration values includes configuration values commonly used by broadband network equipment.

5. The method of claim 2, wherein the configuration table includes twenty sets of commonly used configuration values.

6. The method of claim 1, wherein the configuration values include a Virtual Path Identifier value and a Virtual Channel Identifier value.

7. The method of claim 1, wherein the configuration values include an Asynchronous Transfer Mode encapsulation value.

8. The method of claim 1, further comprising the step of reporting that network access is not available if no response packet is received for any set of configuration values.

9. The method of claim 1, wherein the configuration information from the response packet includes a Virtual Path Identifier value, a Virtual Channel Identifier value, and an ATM encapsulation type value.

10. The method of claim 1, wherein the network access device is a broadband access concentrator.

11. Customer premises equipment, comprising:
    a modem chipset configured to send and receive packets;
    an asynchronous transfer mode segmentation and reassembly module coupled to the modem chipset;
    a memory coupled to the asynchronous transfer mode segmentation and reassembly module, the memory configured to store a plurality of sets of configuration values for the customer premises equipment; and
    a processor, coupled to the memory, capable of executing program instructions,
    the memory including a search module configured to determine which of the plurality of sets of configuration values, if any, is a correct set of configuration values for establishing communications between the customer premises equipment and a network access device, wherein the search module itself selects the correct set of configuration values.

12. The customer premises equipment of claim 11, wherein the configuration values include Virtual Path Identifier values and Virtual Channel Identifier values.

13. The customer premises equipment of claim 11, wherein the configuration values include ATM encapsulation types.

14. The customer premises equipment of claim 11, wherein the plurality of sets of configuration values is a subset of all possible configuration values.

15. The customer premises equipment of claim 11, wherein the plurality of sets of configuration values includes configuration values commonly used to establish communications with broadband network access devices.

16. The customer premises equipment of claim 11, wherein the customer premises equipment is a broadband modem.

17. The customer premises equipment of claim 16, wherein the broadband modem is a Digital Subscriber Line (DSL) modem.

18. The customer premises equipment of claim 11, wherein the plurality of sets of configuration values is stored into the memory at the time of manufacture of the customer premises equipment.

19. The customer premises equipment of claim 11, wherein the search module is configured to select one of the plurality of sets of configuration values and create a discover packet that the modem chip set transmits to a network access device.

20. The customer premises equipment of claim 11, wherein the search module is configured to create a discover packet for each of the plurality of sets of configuration values, and the modem chipset is configured to transmit each of the discover packets to the network access device.

21. A system for customer premises equipment auto-configuration, comprising:
    means for selecting a set of configuration values;
    means for transmitting a discover packet including the set of configuration values to a network access device;
    means for selecting another set of configuration values and transmitting another discover packet including the other set of configuration values if a response packet is not received from the network access device during a predetermined time period; and
    means for storing configuration information from the response packet into memory if a response packet is received from the network access device during the predetermined time period.

* * * * *